June 10, 1958

T. J. BOYER 2,838,727

ALTERNATOR ELECTRIC SYSTEM

Filed May 13, 1957

T. J. BOYER
INVENTOR.

BY E. C. McRae
J. R. Faulkner
J. H. Oster

ATTORNEYS

2,838,727
ALTERNATOR ELECTRIC SYSTEM

Thomas J. Boyer, Livonia, Mich., assignor to Ford Motor Company, Dearborn, Mich., a corporation of Delaware Application May 13, 1957, Serial No. 658,587

3 Claims. (Cl. 320—59)

This invention relates to a combination of a source of two phase alternating current, a storage battery and rectifying means for permitting the utilization of two phase alternating current energy for the charging of a storage battery. Specifically, this invention is designed to improve the performance of vehicular systems which are dependent upon the combination of an alternator, a rectifier and a storage battery for their operation.

Figure 1:
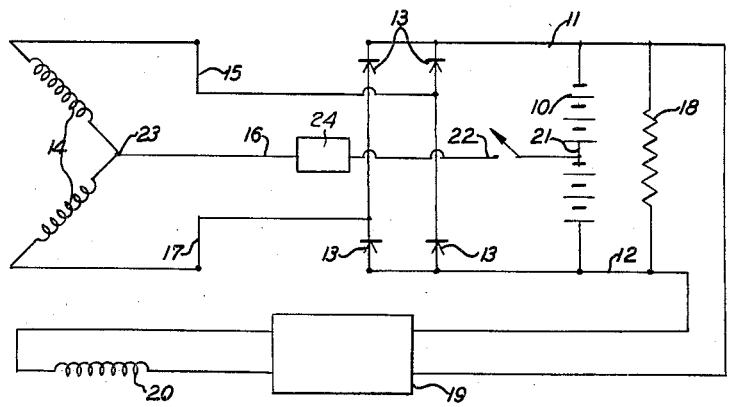
Figure 2:
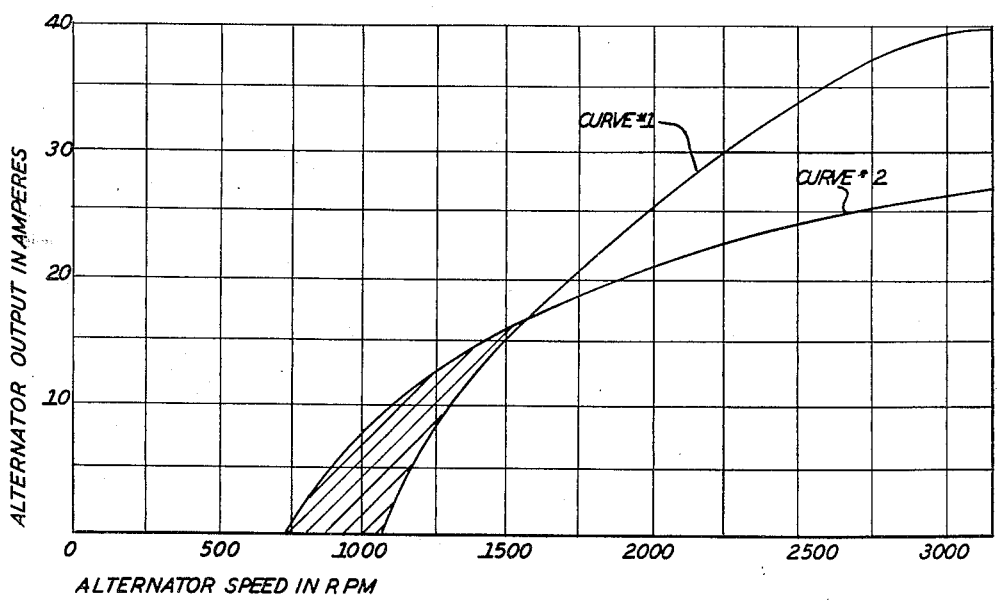

This invention will be discussed in connection with the figure of the drawing in which, Figure 1 is a diagram of a circuit usable in this invention, and Figure 2 is a graph of the results obtainable from this invention.

A cursory inspection will disclose Figure 1 to closely resemble a standard vehicular electrical system in which the storage battery 10 is charged through conductor 11 and conductor 12 through a bank of four rectifiers denominated 13. Alternator armature 14 supplies conductor 11 and conductor 12 by rectifiers 13 and conductors 15, 16 and 17. Load 18 is supplied from conductor 11 and conductor 12. Voltage regulator 19 shunts conductor 11 and conductor 12 and controls alternator field 20 to prevent the development of excessive voltages. The circuit so far as it has been outlined is not novel and no claim is made thereto.

The inventor has discovered that output of any given alternator can be considerably enhanced at low engine speeds by a novel expedient. A third battery terminal 21 is provided on storage battery 10, this battery terminal being at an electrical potential intermediate that of the positive and negative terminals. In the conventional 12 volt vehicle system this third terminal 21 would ordinarily be at a voltage just half way between two conventional terminals. While it is preferred that the battery be electrically symmetrical about third terminal 21 this is not necessary to the practice of the invention. Switch 22 is provided to connect at will third battery terminal 21 to conductor 16 which is connected to a point 23 which is common to both phases of the alternator.

Switch 22 is manually operated and made to connect third battery terminal 21 to conductor 16.

In addition to manual switch 22, control may be had by means of frequency sensitive switch 24 which will close the circuit at low frequency and open the circuit at high frequency.

Figure 2 is a diagram of the alternator output in amperes at various generator speeds. Curve number 1 is an alternator uing the standard connection, that is, with switch 22 open. Curve 2 is the output of the identical machine with switch 22 closed. The hatched area enclosed between curve 1 and curve 2 represents electrical gain. It is, of course, preferred to open switch 22 as the machine attains sufficient speed to cause curve 1 and curve 2 to intersect.

I claim as my invention:

1. An electrical system comprising a storage battery, said storage battery being provided with a positive battery terminal, a negative battery terminal and a third battery terminal at an electrical potential intermediate the positive battery terminal and the negative battery terminal, a first conductor connected to the positive terminal of the battery, a second conductor connected to the negative terminal of the battery, load supplying connections applied to said first conductor and said second conductor, two rectifier conductors shunting the storage battery, a pair of rectifying elements interposed in each of said two rectifier conductors, a two phase energy source connected to said rectifier conductors intermediate the rectifying elements and an electrical connection between the third battery terminal and a point common to the two phases of said energy source.

2. An electrical system comprising a storage battery, said storage battery being provided with a positive battery terminal, a negative battery terminal and a third battery terminal at an electrical potential intermediate the positive battery terminal and the negative battery terminal, a first conductor connected to the positive terminal of the battery, a second conductor connected to the negative terminal of the battery, load supplying connections applied to said first conductor and said second conductor, two rectifier conductors shunting the storage battery, a pair of rectifying elements interposed in each of said two rectifier conductors, a two phase energy source connected to said rectifier conductors intermediate the rectifying elements, an electrical connection between the third battery terminal and a point common to the two phases of said energy source, and a switch capable of breaking the electrical connection to the third battery terminal.

3. An electrical system comprising a storage battery, said storage battery being provided with a positive battery terminal, a negative battery terminal and a third battery terminal at an electrical potential intermediate the positive battery terminal and the negative battery terminal, a first conductor connected to the positive terminal of the battery, a second conductor connected to the negative terminal of the battery, load supplying connections applied to said first conductor and said second conductor, two rectifier conductors shunting the storage battery, a pair of rectifying elements interposed in each of said two rectifier conductors, a two phase energy source connected to said rectifier conductors intermediate the rectifying elements, an electrical connection between the third battery terminal and a point common to the two phases of said energy source, and a frequency sensitive switch capable of breaking the electrical connection to the third battery terminal.

No references cited.